US012479703B2

(12) United States Patent
Shirota

(10) Patent No.: US 12,479,703 B2
(45) Date of Patent: Nov. 25, 2025

(54) BRAKE DEVICE, LEVER HOIST, AND RATCHET MECHANISM

(71) Applicant: Kito Corporation, Yamanashi (JP)

(72) Inventor: Akinori Shirota, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 436 days.

(21) Appl. No.: 17/918,334

(22) PCT Filed: Jan. 28, 2021

(86) PCT No.: PCT/JP2021/002971
§ 371 (c)(1),
(2) Date: Oct. 12, 2022

(87) PCT Pub. No.: WO2021/210236
PCT Pub. Date: Oct. 21, 2021

(65) Prior Publication Data

US 2023/0143207 A1 May 11, 2023

(30) Foreign Application Priority Data

Apr. 14, 2020 (JP) ................................ 2020-072176

(51) Int. Cl.
*B66D 5/32* (2006.01)
*B66D 3/14* (2006.01)
*B66D 5/34* (2006.01)

(52) U.S. Cl.
CPC ................. *B66D 5/32* (2013.01); *B66D 3/14* (2013.01); *B66D 5/34* (2013.01)

(58) Field of Classification Search
CPC ............... B66D 5/32; B66D 5/34; B66D 3/14
(Continued)

(56) References Cited

U.S. PATENT DOCUMENTS 2,803,489 A * 8/1957 Zito ........................ B66C 1/485 269/208
3,138,030 A * 6/1964 Godel ..................... F16H 31/00 74/462
(Continued)

FOREIGN PATENT DOCUMENTS

CN 2075817 U * 4/1991
CN 2083332 U 8/1991
(Continued)

OTHER PUBLICATIONS

CN2075817U (Year: 1991).*
(Continued)

*Primary Examiner* — Thomas J Williams
(74) *Attorney, Agent, or Firm* — XSENSUS LLP

(57) ABSTRACT

A brake device comprising: a brake receiver pivotally supported in a non-rotatable manner on the drive shaft and including a flange part and a boss part; a female screw member pivotally supported in a rotatable manner on the drive shaft and screwed to a male screw part; a ratchet wheel including ratchet teeth provided on an outer peripheral side and configured to restrict a rotation direction to one direction; a brake plate arranged between the ratchet wheel and at least one of the flange part and the female screw member; and at least one pawl member engaging, on a tip side, with a valley part located between adjacent ratchet teeth, and meshing with the ratchet tooth, wherein the ratchet teeth include tall teeth and short teeth lower in projection height from a rotation center of the ratchet wheel than the tall teeth.

11 Claims, 6 Drawing Sheets

(58) Field of Classification Search

USPC ...... 188/30, 82.2, 82.3, 82.34, 82.7; 74/575, 74/577 R, 577 M; 254/350, 352, 353, 254/354, 356, 357

See application file for complete search history.

(56) References Cited

U.S. PATENT DOCUMENTS

| | | | | | |
|---|---|---|---|---|---|
| 4,117,743 | A * | 10/1978 | Suzuki | H01H 13/58 74/577 M |
| 4,287,396 | A * | 9/1981 | Greenwald | G07F 15/12 194/353 |
| 5,226,342 | A * | 7/1993 | Panin | G05G 5/06 74/577 M |
| 5,676,022 | A | 10/1997 | Ose | |
| 6,406,001 | B1 * | 6/2002 | Wada | B66D 3/14 254/352 |
| 6,517,054 | B2 * | 2/2003 | Samejima | B66D 3/14 254/352 |
| 2017/0174483 | A1 | 6/2017 | Shirota | |
| 2023/0143207 | A1 * | 5/2023 | Shirota | B66D 3/14 188/82.7 |

FOREIGN PATENT DOCUMENTS

| | | | |
|---|---|---|---|
| CN | 202625719 | U | 12/2012 |
| CN | 104812695 | A | 7/2015 |
| JP | 48-21857 | Y1 | 6/1973 |
| JP | 6-53392 | U | 7/1994 |
| JP | H06-263396 | A | 9/1994 |
| JP | 7-9896 | Y2 | 3/1995 |
| JP | 2008-222393 | A | 9/2008 |
| JP | 2011-102182 | A | 5/2011 |
| TW | 201600447 | A | 1/2016 |

OTHER PUBLICATIONS

Office Action issued on Aug. 9, 2024, in corresponding Taiwanese patent Application No. 110106651, 4 pages.

International Search Report and Written Opinion mailed on Mar. 23, 2021, received for PCT Application PCT/JP2021/002971, filed on Jan. 28, 2021, 8 pages including English Translation.

Office Action issued on May 20, 2025, in corresponding Japanese patent Application No. 2024-039921, 8 pages.

Office Action issued on Jun. 11, 2025, in corresponding Chinese patent Application No. 202180028007.2, 12 pages.

* cited by examiner

BRAKE DEVICE, LEVER HOIST, AND RATCHET MECHANISM

CROSS REFERENCE TO RELATED APPLICATIONS

This is a U.S. national stage of application No. PCT/JP2021/002971, filed on Jan. 28, 2021. Priority under 35 U.S.C. § 119 (a) and 35 U.S.C. § 365 (b) is claimed from Japanese Patent Applications No. 2020-072176 filed on Apr. 14, 2020. The entire content and disclosure of each of the foregoing applications is incorporated herein by reference.

TECHNICAL FIELD

The present invention relates to a brake device, a lever hoist, and a ratchet mechanism.

BACKGROUND ART

A lever hoist is widely used for a work of raising/lowering and pulling a cargo or fixing a cargo by a sling or the like (fastening a cargo). This lever hoist can perform hoisting (winding) and lowering (unwinding) of a chain by operating an operation lever with a hand. An example of the lever hoist is, for example, the one disclosed in Patent Literature 1. In the lever hoist disclosed in Patent Literature 1, the operation lever is operated to drive a drive member, and a drive shaft is rotated via the drive member to rotate a load sheave. This makes it possible to lift a cargo and lower the cargo. Note that the lever hoist is provided with a switching knob, and a switching operation of the switching knob can switch to which of a hoisting direction or a lowering direction a driving force from the operation lever is transmitted.

CITATION LIST

Patent Literature

{PTL 1} JP 2011-102182 A

SUMMARY OF INVENTION

Technical Problem

Incidentally, in the case where the switching knob is switched to the lowering direction side by mistake in hoisting the lever hoist, a brake mechanism may not work any longer. More specifically, if the switching knob is switched to the lowering direction by mistake in a state where a tip of a pawl member is in contact with a tip of a ratchet tooth of a ratchet wheel, the ratchet wheel may start to powerfully rotate by the action of the load of the cargo.

If the tip of the pawl member can enter a valley part between the ratchet teeth at a stage of the start of rotation of the ratchet wheel, the rotation of the ratchet wheel can be stopped. However, if the switching knob is switched and the ratchet wheel starts to powerfully rotate in a state where the tip of the pawl member is in contact with the tip of the ratchet tooth, a next ratchet tooth (next tooth) reaches earlier than a time period required for the pawl member to enter the valley part, the pawl member collides with the tip of the next tooth and bounced to cause the same state thereafter, and the tip of the pawl member cannot enter the valley part any longer, failing to stop the rotation of the ratchet wheel. The rotation of the ratchet wheel cannot be blocked with the configuration disclosed in Patent Literature 1.

The present invention has been made in consideration of the above circumstances, and has an object to provide a brake device, a lever hoist, and a ratchet mechanism which can block reverse rotation of a ratchet wheel.

Solution to Problem

To solve the above problem, according to a first viewpoint of the present invention, there is provided a brake device which stops reverse rotation of a drive shaft transmitting rotation to a load sheave around which a chain is wound to prevent reverse rotation of the load sheave, the brake device including: a brake receiver pivotally supported in a non-rotatable manner on the drive shaft and including a flange part and a boss part; a female screw member pivotally supported in a rotatable manner on the drive shaft and screwed to a male screw part provided at an outer periphery of the drive shaft; a ratchet wheel sandwiched between the flange part and the female screw member facing each other, and including ratchet teeth provided on an outer peripheral side and configured to restrict a rotation direction to one direction; a brake plate arranged between the ratchet wheel and at least one of the flange part and the female screw member; and at least one pawl member engaging, on a tip side, with a valley part located between adjacent ratchet teeth, and meshing with the ratchet tooth, wherein the ratchet teeth include tall teeth and short teeth lower in projection height from a rotation center of the ratchet wheel than the tall teeth.

Further, in another aspect of the present invention, it is preferable in the above invention that a pair of the pawl members are provided, and the pair of pawl members are arranged at positions symmetric around the drive shaft.

Further, in another aspect of the present invention, it is preferable in the above invention that the ratchet wheel is alternately provided with the tall teeth and the short teeth.

Further, in another aspect of the present invention, it is preferable in the above invention that a number of the ratchet teeth equal to double an odd number are provided.

Further, in another aspect of the present invention, it is preferable in the above invention that a short tooth tip part on a tip side of the short tooth forms a part of an arc.

Further, to solve the above problem, according to a second viewpoint of the present invention, there is provided a lever hoist including the brake device according to the above invention, the lever hoist including: an operation lever configured to turn with respect to the female screw member; a switching claw for hoisting attached to the operation lever, and meshing in a hoisting direction with a switching gear integral with the female screw member; a switching claw for lowering attached to the operation lever, and meshing in a lowering direction with the switching gear; and a switching knob provided integrally with the switching claw for hoisting and the switching claw for lowering, and configured to switch with which of the switching claw for hoisting and the switching claw for lowering the switching gear meshes.

Further, to solve the above problem, according to a third viewpoint of the present invention, there is provided a ratchet mechanism including a ratchet wheel formed with a plurality of ratchet teeth at an outer periphery and at least one pawl member meshing with the ratchet tooth, to allow rotation of the ratchet wheel only in one direction, wherein the ratchet teeth include tall teeth and short teeth lower in projecting height from a rotation center of the ratchet wheel than the tall teeth.

Advantageous Effects of Invention

The present invention can provide a brake device, a lever hoist, and a ratchet mechanism which can block reverse rotation of a ratchet wheel even when a switching knob is operated to a lowering direction side by mistake in hoisting.

DESCRIPTION OF EMBODIMENTS

Hereinafter, a lever hoist 10 according to one embodiment of the present invention will be explained based on the drawings.

<Regarding the Overall Configuration of the Lever Hoist>

In the following explanation, an X-direction is an axial direction of a drive shaft 25 arranged between a gear box (whose sign is omitted) in which a reduction gear 30 is arranged and a quick-turn grip 60 (hereinafter, referred to as an "idling grip"), an X1 side is a side to which the idling grip 60 is attached, and an X2 side is a gear box side opposite thereto. Further, a Z-direction is a vertical direction (suspension direction; hoisting and lowering direction) in a suspension state of the lever hoist 10, a Z1 side is an upper side in the suspension state, and a Z2 side is a lower side in the suspension state.

Figure 1:
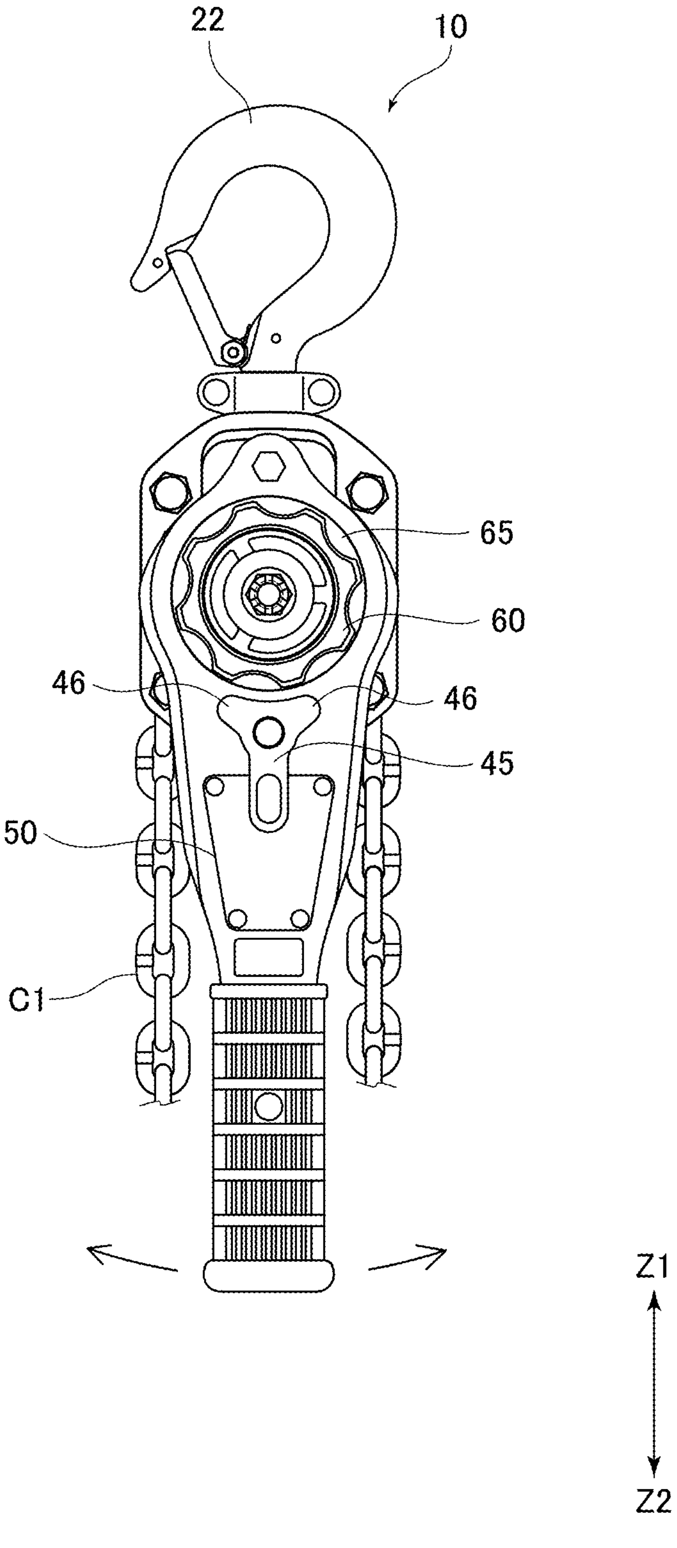
FIG. 1 is a front view illustrating an example of a configuration of a lever hoist to which a power transmission device for lever hoist of the present invention is attached.
Figure 2:
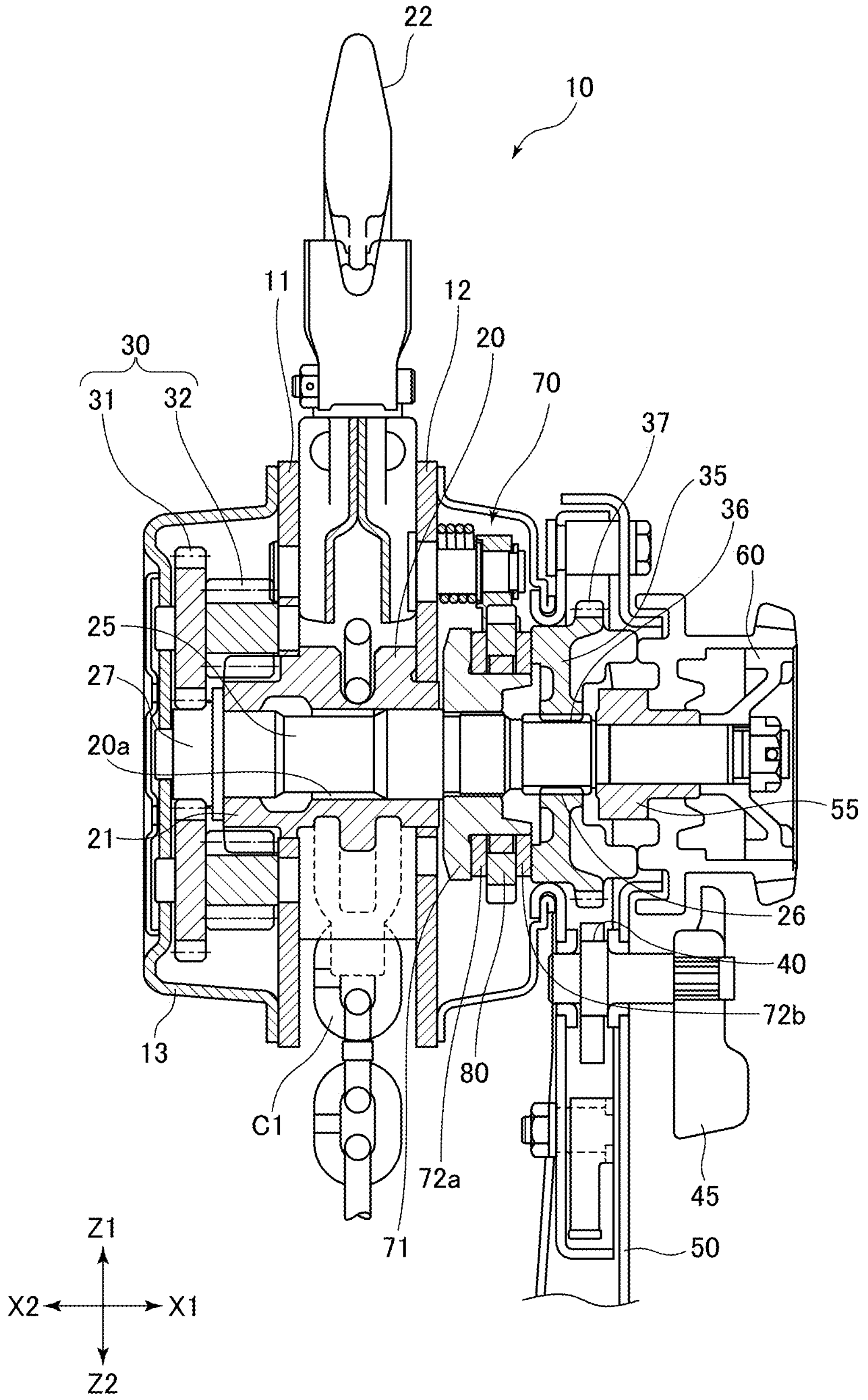
FIG. 2 is a cross-sectional view illustrating the configuration of the lever hoist illustrated in FIG. 1.

FIG. 1 is a front view illustrating an example of a configuration of the lever hoist 10. FIG. 2 is a cross-sectional view illustrating the configuration of the lever hoist 10 illustrated in FIG. 1.

As illustrated in FIG. 2, the lever hoist 10 includes a pair of frames 11, 12, and an upper hook 22 is supported on the upper side (Z1 side) of the pair of frames 11, 12. Further, between the pair of frames 11, 12, a load sheave 20 around which a chain C1 is wound is supported in a rotatable state. The load sheave 20 is integrally molded with a load gear 21 which meshes with a small-diameter gear part 32 of a later-explained reduction gear 30. Further, the load sheave 20 is formed with an insertion hole 20*a* penetrating in the axial direction (X-direction), and the drive shaft 25 is inserted in the insertion hole 20*a*. A male screw part 26 which meshes with a later-explained female screw member 35 is provided on an outer peripheral side in the middle of the drive shaft 25, and a pinion gear 27 which meshes with a large-diameter gear part 31 of the reduction gear 30 is provided on the other side (X2 side) of the drive shaft 25. Further, the reduction gear 30 is also integrally provided with the small-diameter gear part 32 which meshes with the aforementioned load gear 21.

Note that a casing 13 is attached to the frame 11 to protect a drive section such as the aforementioned reduction gear 30, load gear 21 and so on. Further, the aforementioned male screw part 26 meshes with a female screw part 36 of the female screw member 35. The female screw member 35 is provided, at its peripheral edge portion, with a switching gear 37 capable of meshing with a switching claw 40 at a lower position (Z2 side) in addition to the female screw part 36. The switching claw 40 is, for example, a ratchet claw which is provided on each of one side and the other side of a later-explained operation lever 50, and the later-explained operation lever 50 is turned in a state where the switching claw 40 mesh with the switching gear 37 to transmit driving force to the female screw member 35.

Further, a switching knob 45 is attached in a state of being coaxial with the switching claw 40, and a switching operation of the switching knob 45 can switch in which of a hoisting direction or a lowering direction the driving force to the female screw member 35 is transmitted. For example, when the lower side (Z2 side) of the switching knob 45 is tilted to the left side in FIG. 1, the switching claw 40 for hoisting meshes with the switching gear 37. Thus, when the operation of turning the operation lever 50 is repeated, the switching gear 37 rotates in the hoisting direction but does not rotate in the lowering direction. This corresponds to a hoisting state of the chain C1.

In addition, as illustrated in FIG. 1, a pair of engagement protruding parts 46 are provided on an upper side (Z1 side) of the switching knob 45. One engagement protruding part 46 of the aforementioned pair of engagement protruding parts 46 engages with a flange part 65 of the idling grip 60 and thereby prevents the idling grip 60 from being pulled out to the one side (X1 side) in the axial direction (X-direction). Therefore, it is possible to keep a state where a not-illustrated urging spring presses a brake mechanism.

On the other hand, when the lower side (Z2 side) of the switching knob 45 is tilted to the right side in FIG. 1, the switching claw 40 for lowering meshes with the switching gear 37. Thus, when the operation of turning the operation lever 50 is repeated, the switching gear 37 rotates in the lowering direction but does not rotate in the hoisting direction. This corresponds to a lowering state of the chain C1. In addition, the other engagement protruding part 46 engages with the flange part 65 of the idling grip 60 and thereby prevents the idling grip 60 from being pulled out to the one side (X1 side) in the axial direction (X-direction). Therefore, it is possible to keep a state where the not-illustrated urging spring presses the brake mechanism.

Further, when the lower side (Z2 side) of the switching knob 45 is located at a neutral position being a position between the hoisting direction and the lowering direction (in this case, the switching knob 45 is located in a direction along the long side direction of the operation lever 50), both of the switching claw 40 for hoisting and the switching claw 40 for lowering are brought into a state of not meshing with the switching gear 37. This brings about a free (idling) state in which even when the operation of turning the operation lever 50 is performed, any of the operations of hoisting and lowering the chain C1 is not executed. In this event, any of the pair of engagement protruding parts 46 does not engage with the flange part 65 of the idling grip 60. Therefore, it becomes possible to pull the idling grip 60 out to the one side (X1 side) in the axial direction (X-direction) and to loosen the state where the not-illustrating urging spring presses the brake mechanism.

Further, a cam member 55 is attached to the drive shaft 25 in a non-rotatable state with respect to the drive shaft 25, and a member called the idling grip 60 is attached on a side closer to the one end (X1 side) in the axial direction (X-direction) than the cam member 55 also in a non-rotatable state with respect to the drive shaft 25.

The idling grip 60 is an almost circular handle-shaped portion rotatable together with the drive shaft. On the other side (X2 side) in the axial direction (X-direction) of the idling grip 60, the flange part 65 is provided. When any of the pair of engagement protruding parts 46 engages with the flange part 65, the idling grip 60 cannot be pulled out to the one side (X1 side) in the axial direction (X-direction) any longer. Therefore, it is possible to keep the state where the not-illustrated urging spring presses the brake mechanism.

During the hoisting and lowering, the idling grip 60 is pressed in toward the other side (X2 side) in the axial direction (X-direction) as illustrated in FIG. 2. However, when the switching knob 45 is at the neutral position (neutral state), the idling grip 60 can be pulled out to the one side (X1 side) in the axial direction (X-direction). In the case where the idling grip 60 is pulled out to the one side (X1 side) in the axial direction (X-direction), the pressing force of the urging spring urging the brake mechanism weakens to bring about a brake release state so that the chain 60 can be freely pulled out in any of directions on the hoisting side and the lowering side while gripping the chain C1 with a hand or the like.

<Regarding the Brake Device 70>

Figure 3:
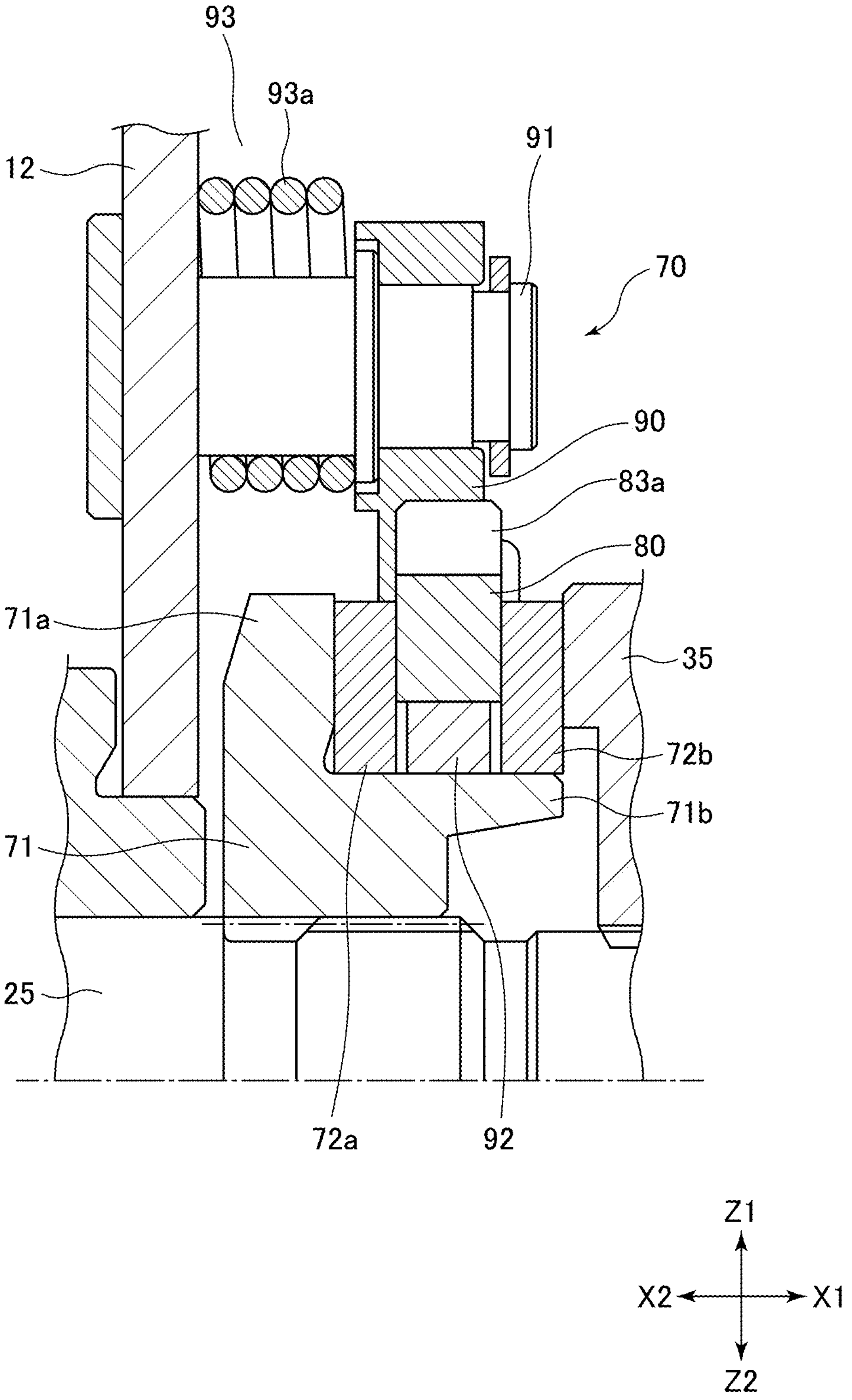
FIG. 3 is an enlarged partial cross-sectional view illustrating the vicinity of a brake device of the lever hoist illustrated in FIG. 1.

FIG. 3 is an enlarged partial cross-sectional view illustrating the vicinity of the brake device 70 of the lever hoist illustrated in FIG. 1. As illustrated in FIG. 2 and FIG. 3, the brake device 70 is arranged between the operation lever 50 and the drive shaft 25. The brake device 70 has a brake receiver 71, brake plates 72*a*, 72*b*, a ratchet wheel 80, a pawl member 90, a pawl shaft 91, a bush 92 and so on as main components.

The brake receiver 71 has a flange part 71*a* and a hollow boss part 71*b* (corresponding to a boss part). The flange part 71*a* is a portion provided to be larger in diameter than the hollow boss part 71*b*, and can receive the brake plate 72*a*.

The hollow boss part 71*b* is located on a side closer to the female screw member 35 (X1 side) than the flange part 71*a*, and pivotally supports the ratchet wheel 80 via the bush 92. Note that the inner peripheral side of the hollow boss part 71*b* meshes with the drive shaft 25 by key-coupling, spline coupling, or the like, whereby the drive shaft 25 and the brake receiver 71 integrally rotate.

Further, the brake plates 72*a*, 72*b* are pivotally supported on the hollow boss part 71*b* between the flange part 71*a* and the ratchet wheel 80 and between the female screw member 35 and the ratchet wheel 80, respectively. The brake plate 72*a*, 72*b* is a friction material formed, for example, by sintering or the like a predetermined material.

Here, in the case where a load acts on the drive shaft 25 in the lowering direction, the female screw member 35 presses the brake plates 72*a*, 72*b* by a screw fastening action of the female screw member 35 and the brake receiver 71 (flange part 71*a*). This strongly presses the brake plates 72*a*, 72*b*, and the brake plates 72*a*, 72*b* strongly press the ratchet wheel 80. Here, the pawl member 90 is locked on the ratchet wheel 80 to block the rotation of the ratchet wheel 80 in the lowering direction, so that the above strong press brakes the turning of the drive shaft 25 in the lowering direction.

Note that when the switching knob 45 is switched to the hoisting direction and the operation lever 50 is operated, the ratchet wheel 80 can rotate in the hoisting direction, so that the turning in the hoisting direction is not blocked by the ratchet wheel 80. Accordingly, the operation of the operation lever 50 causes the female screw member 35, the brake plates 72*a*, 72*b*, the ratchet wheel 80, and the brake receiver 71 integrally turn the drive shaft 25, and its driving force is transmitted to the load sheave 20 via the reduction gear 30 to hoist the chain C1.

On the other hand, when the switching knob 45 is switched to the lowering direction and the operation lever 50 is operated, the female screw member 35 is rotated by the operation amount to relax the screw fastening action of the brake receiver 71. Therefore, the brake force with the ratchet wheel 80 is released according to the operation amount of the operation lever 50 (namely, the rotation amount of the female screw member 35), so that the brake receiver 71 and the drive shaft 25 turn in the lowering direction. The driving force in the lowering direction is transmitted to the load sheave 20 via the reduction gear 30 to lower the chain C1.

Further, a ratchet tooth 83 (later explained) provided on the ratchet wheel 80 meshes with a tip part 90*a* of the pawl member 90. The mesh constitutes a ratchet mechanism which allows rotation in the hoisting direction while preventing the rotation in the lowering direction of the ratchet wheel 80 except when switching the switching knob 45 to the lowering direction and operating the operation lever 50.

Further, as illustrated in FIG. 3, the bush 92 is provided on the outer peripheral side of the hollow boss part 71*b* of the brake receiver 71, and the ratchet wheel 80 is provided on the outer peripheral side of the bush 92.

Further, the pawl shaft 91 is attached to the frame 12, and the pawl member 90 is turnably supported on the pawl shaft 91. Further, a coil part 93*a* of a torsion spring 93 is attached to the pawl shaft 91, and the torsion spring 93 applies an urging force in a direction in which the pawl member 90 is pressed against the ratchet tooth 83 (later explained) of the ratchet wheel 80. Note that a pair of pawl members 90 are provided and arranged to be point-symmetric with each other about a center axis of the drive shaft 25 in the circumferential direction of the ratchet wheel 80.

<Regarding the Ratchet Wheel 80>

Figure 4:
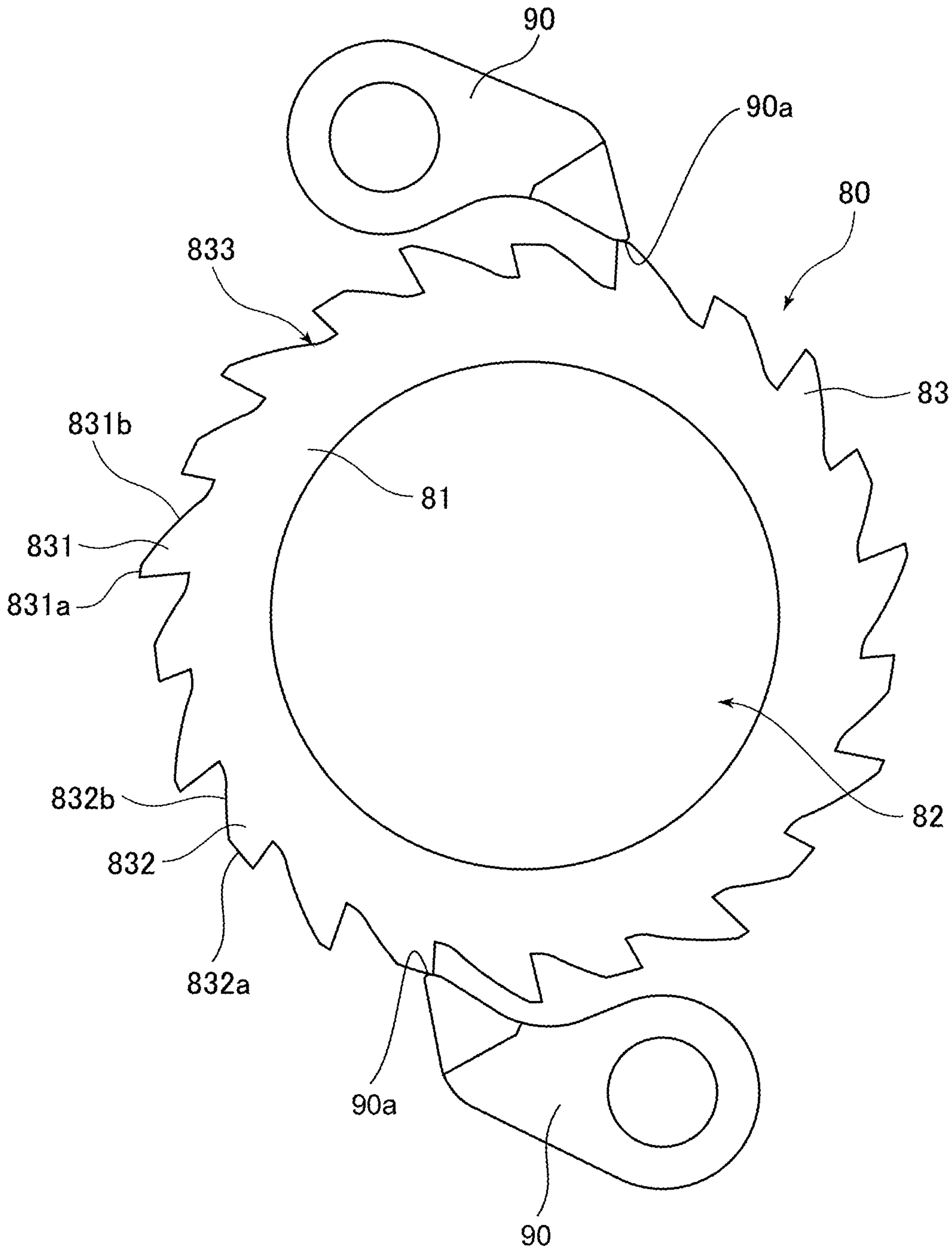
FIG. 4 is a plane view illustrating a ratchet wheel and pawl members of the lever hoist illustrated in FIG. 1, and is a view illustrating a state where a number of ratchet teeth equal to double an odd number are provided.

Next, the configuration of the ratchet wheel 80 will be explained. FIG. 4 is a plane view illustrating the ratchet wheel 80 and the pawl members 90, and is a plane view illustrating an example of a configuration in which the number of ratchet teeth 83 is equal to double an odd number and illustrating an arrangement of the pawl members 90. As illustrated in FIG. 4, the ratchet wheel 80 is provided with a ring-shaped part 81 in a ring-shape, and the front surface and the rear surface of the ring-shaped part 81 are portions against which the aforementioned brake plates 72*a*, 72*b* are pressed. Note that the aforementioned bush 92 is located in a center hole 82 located at the center of the ring-shaped part 81, whereby the ratchet wheel 80 is rotatably supported.

Figure 5:
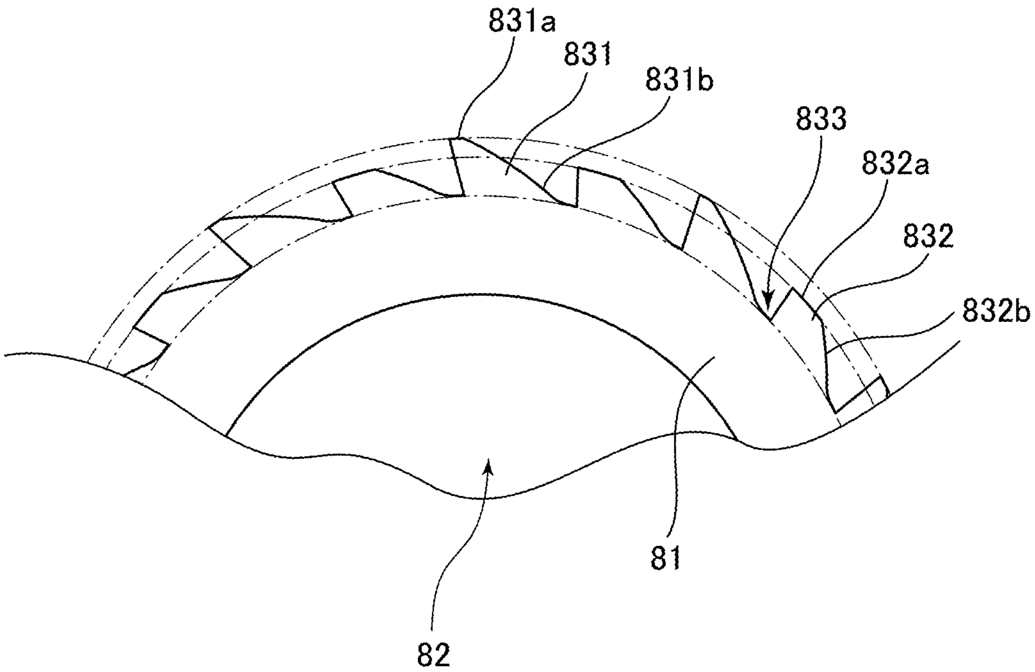
FIG. 5 is an enlarged view illustrating the vicinity of the ratchet teeth of the ratchet wheel illustrated in FIG. 4.

From the ring-shaped part 81, the ratchet teeth 83 project toward the outer periphery. FIG. 5 is an enlarged view illustrating the vicinity of the ratchet teeth 83 of the ratchet wheel 80. As illustrated in FIG. 5, the ratchet teeth 83 include tall teeth 831 and short teeth 832. A tip portion of the tall tooth 831 (tall tooth tip part 831*a*) of them projects farther to the outside diameter side than a tip portion of the short tooth 832 (short tooth tip part 832*a*). Therefore, the tip part 90*a* of the pawl member 90 at a position where the tip part 90*a* comes into contact with the short tooth tip part 832*a* by the urging force of the torsion spring 93 is located closer to the center side in the radial direction (inside diameter side) than a position where the tip part 90*a* comes into contact with the tall tooth tip part 831*a*.

Here, in this embodiment, the tall teeth 831 and the short teeth 832 are alternately and adjacently formed, and are provided at regular lengths (pitches) in the circumferential direction. Further, assuming that a space between the tall tooth 831 and the short tooth 832 is a valley part 833, an inclination angle of a tapered part 831*b* from the valley part 833 toward the tall tooth tip part 831*a* on the tip side of the tall tooth 831 is provided to be equal to an inclination angle of a tapered part 832*b* from the valley part 833 toward the short tooth tip part 832*a* on the tip side of the short tooth 832. Accordingly, in this embodiment, the short tooth 832 is provided in a form obtained by cutting the tip side of the tall tooth 831. Note that the short tooth tip part 832*a* of the short tooth 832 may be a part of an arc concentric with the ratchet wheel 80. However, the short tooth tip part 832*a* may have a shape other than the part of the arc (for example, a linear shape) or may be a part of an arc not concentric with the ratchet wheel 80.

Further, the total number ratchet teeth 83 including the tall teeth 831 and the short teeth 832 is an even number. Here, in the case where the number of the ratchet teeth 83 is the number obtained by doubling an odd number as illustrated in FIG. 4, when the tip part 90*a* of one of the pawl members 90 is pressed against the tall tooth 831, the other pawl member 90 is pressed against the short tooth 832. Either the one pawl member 90 or the other pawl member 90 is certainly pressed against the short tooth 832, so that the tip part 90*a* of at least the pawl member 90 pressed against the short tooth 832 certainly collides with (the back of) the tall tooth 831 adjacent thereto when the reverse rotation occurs. This can surely block the reverse rotation of the ratchet wheel 80. Note that in the configuration illustrated in FIG. 4, the number of existing ratchet teeth 83 is 22 in total, but the number of the ratchet teeth 83 may be any number as long as it is the number obtained by doubling an odd number.

Figure 6:
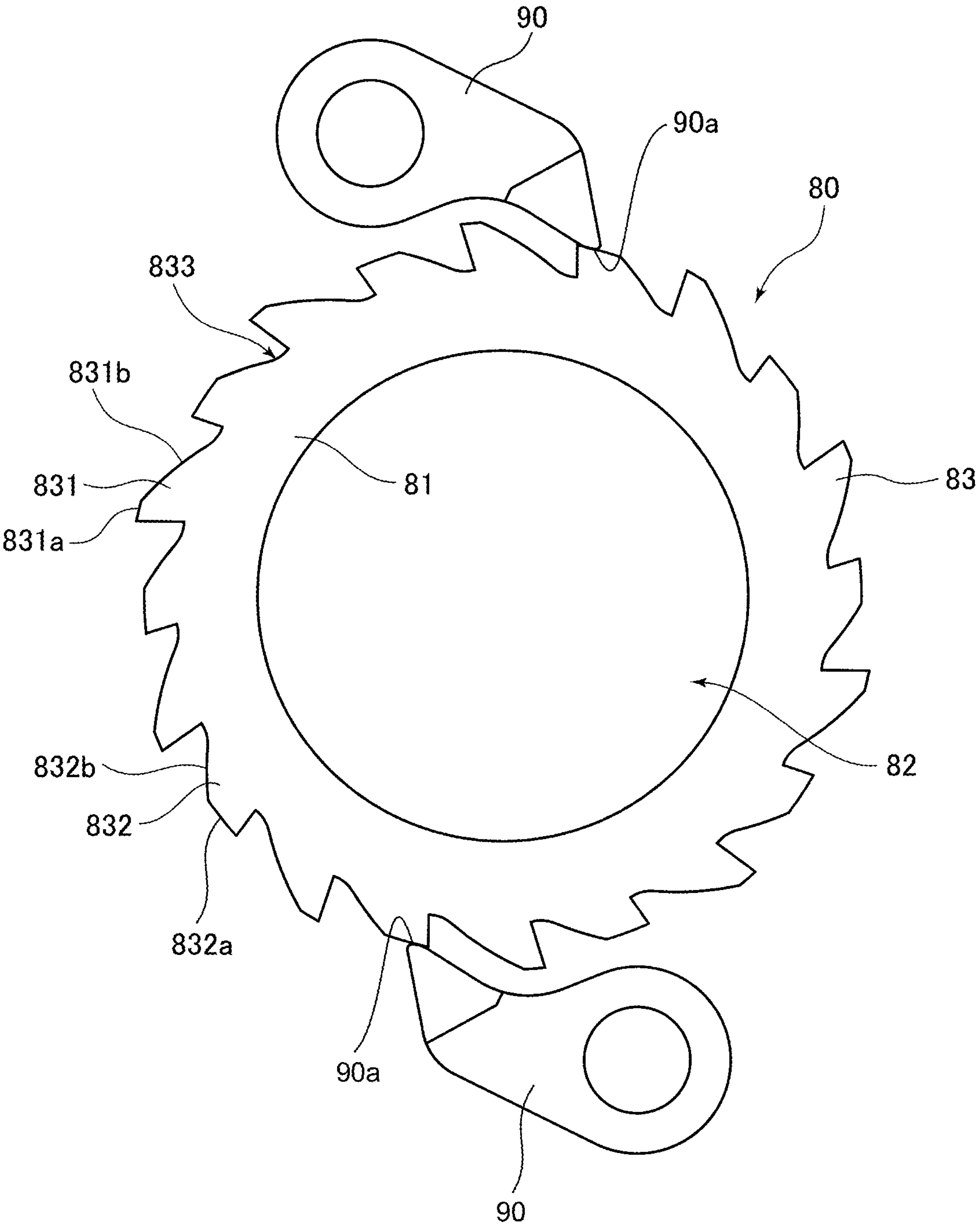
FIG. 6 is a plane view illustrating a ratchet wheel and pawl members of the lever hoist illustrated in FIG. 1, and is a view illustrating a state where a number of ratchet teeth equal to double an even number are provided.

However, in the case where the total number of the ratchet teeth 83 including the tall teeth 831 and the short teeth 832 is the number obtained by doubling an even number (the number of a multiple of four) as illustrated in FIG. 6, when the tip part 90*a* of the one pawl member 90 is pressed against the tall tooth 831, the other pawl member 90 is also pressed against the tall tooth 831. Besides, when the tip part 90*a* of the one pawl member 90 is pressed against the short teeth 832, the other pawl member 90 is also pressed against the short teeth 832. Also in this case, the tip part 90*a* of the pawl member 90 pressed against the short tooth 832 when the revers rotation occurs certainly collides with (the back of) the tall tooth 831 adjacent thereto, or the interval between the adjacent tall teeth 831 becomes wider than the interval between ratchet teeth at the same height provided at the current ratchet wheel, whereby the tip part 90*a* of the pawl member 90 pressed against the tall tooth 831 can sufficiently block the reverse rotation of the ratchet wheel 80. Note that in the configuration illustrated in FIG. 6, the number of the existing ratchet teeth 83 is 20 in total, but the number of the ratchet teeth 83 may be any number as long as it is the number obtained by doubling an even number.

<Regarding the Operation and Effects>

The brake device 70 and the lever hoist 10 in the above configuration each includes: the brake receiver 71 pivotally supported in a non-rotatable manner on the drive shaft 25 and including the flange part 71*a* and the hollow boss part 71*b* (boss part); the female screw member 35 pivotally supported in a rotatable manner on the drive shaft 25 and screwed to the male screw part 26 provided at the outer periphery of the drive shaft 25; the ratchet wheel 80 sandwiched between the flange part 71*a* and the female screw member 35 facing each other, and including the ratchet teeth 83 provided on the outer peripheral side and configured to restrict the rotation direction to one direction; the brake plate 72*a*, 72*b* arranged between the ratchet wheel 80 and at least one of the flange part 71*a* and the female screw member 35; and at least one pawl member 90 meshing with the ratchet tooth 83 and engaging on the tip part 90*a* (tip end side) with the valley part 833 located between the adjacent ratchet teeth 83, wherein the ratchet wheel 80 is provided with the tall teeth 831, and the short teeth 832 lower in projection height from a rotation center of the ratchet wheel 80 than the tall teeth 831.

Here, a case where the switching knob 45 is switched to the lowering direction by mistake in a state where the tip part 90*a* of the pawl member 90 is in contact with the tall tooth tip part 831*a* on the tip side of the tall tooth 831 is considered. In this case, by the action of the load of a cargo, the ratchet wheel 80 tries to start to powerfully rotate (reversely rotate). However, the ratchet wheel 80 is provided with the tall teeth 831 and the short teeth 832 as explained above. Therefore, the tip part 90*a* of the pawl member 90 after passing through the short tooth tip part 832*a* of the short tooth 832 collides with the back of the adjacent tall tooth 831. This can prevent the reverse rotation of the ratchet wheel 80.

Further, in this embodiment, it is preferable that the tall teeth 831 and the short teeth 832 are alternately provided at the ratchet wheel 80. In this configuration, in the case where the tip part 90*a* of at least one of the pawl members 90 is in contact with the short tooth tip part 832*a* of the short tooth 832, when the ratchet wheel 80 starts to rotate (reversely rotate), the tip part 90*a* immediately collides with the back of the tall tooth 831 being the next tooth. Besides, in the case where the tip part 90*a* of at least of the pawl members 90 is in contact with the tall tooth tip part 831*a* of the tall tooth 831, the tip part 90*a* immediately collides with the back of the tall tooth 831 even if the ratchet wheel 80 starts to rotate (reversely rotates) and the tip part 90*a* climbs over the short tooth tip part 832*a*. This can prevent the reverse rotation of the ratchet wheel 80 at an early stage.

Further, in this embodiment, it is preferable to provide a number of the ratchet teeth 83 equal to double an odd number. In the case of constituting as above, when the tip part 90*a* of the one pawl member 90 is pressed against the tall tooth 831, the other pawl member 90 is pressed against the short tooth 832. Certainly pressing either the one pawl member 90 or the other pawl member 90 against the short tooth 832 makes it possible to press the tip part 90*a* of one of the pawl members 90 against the short tooth tip part 832*a* closer to the inside diameter than the tall tooth tip part 831*a* of the ratchet wheel 80 even if the ratchet wheel 80 reversely rotates at a speed higher than expected, thereby surely blocking the reverse rotation of the ratchet wheel 80.

Further, in this embodiment, the short tooth tip part 832*a* on the tip side of the short tooth 832 can be formed to form a part of an arc. In the case of constituting this, the circumferential length of the short tooth tip part 832*a* becomes longer than the circumferential length of the tall tooth tip part 831*a*. This makes it possible to make the time during which the tip part 90*a* of the pawl member 90 is in contact with the short tooth tip part 832*a* longer than that with the tall tooth tip part 831*a*, thus more surely blocking the reverse rotation of the ratchet wheel 80. Further, it becomes possible to easily process the short tooth tip part 832*a* using, for example, a machine tool, thus improving the productivity.

Modification Example

Embodiments of the present invention have been explained above, and the present invention is variously modifiable. Hereinafter, those modifications will be explained.

An idling device which switches idling/non-idling by operating the idling grip 60 is explained in the above embodiment, but a lever hoist provided with an idling device by another system such as an automatic idling system may be employed.

Further, the case where the brake device 70 is applied to the lever hoist 10 is explained in the above embodiment. However, the above brake device may be applied to a hoisting machine other than the lever hoist, such as a chain block.

Further, the case where a pair of pawl members 90 are provided is explained in the above embodiment. However, only one pawl member 90 may be provided, or three or more pawl members 90 may be provided. In the case of three or more pawl members 90 are provided, it is preferable that the pawl members 90 are evenly arranged on the outer peripheral side of the ratchet wheel 80, and that when one pawl member 90 engages with the valley part located between ratchet teeth adjacent to the tall teeth, at least one of the other pawl members 90 engages with the valley part located between ratchet teeth adjacent to the small teeth.

However, it is also possible to arrange a plurality of pawl members 90 not evenly on the outer peripheral side of the ratchet wheel 80. In this case, it is preferable to arrange them so that that radial forces acting on the pawl shafts 21 of the pawl members 90 become equal. For example, four pawl members 90 may be arranged two by two line-symmetric about a line orthogonal to the drive shaft 25. Arranging the plurality of pawl members 90 so that the radial forces acting on the pawl shafts 21 become equal disperses the forces acting on the ratchet wheel 80 from the pawl members 90, resulting in improved durability of the ratchet wheel 80. Further, the arrangement of the pawl members 90 as above can reduce the imbalance of the force acting on the drive shaft 25 from the ratchet wheel 80, resulting in improved durability of the drive shaft 25 and members therearound.

Further, a pair of pawl members 90 are provided, and the pair of pawl members 90, 90 most preferably have the same shape and are arranged at positions point-symmetric about the drive shaft 25, but the pawl members 90 may have different shapes as long as they are shaped and arranged so that the tip parts 90*a* of the pawl members 90 engage at the same time with the valley parts 83 to be engaged respectively. For example, evenly arranging two or more pawl members 90 on the outer peripheral side of the ratchet wheel 80 makes it possible to disperse the force applied on one pawl member 90 and to reduce the radial force acting on the pawl shaft 91 where the ratchet wheel 80 is arranged. However, the engagement positions of the tip parts 90*a* are actually most preferably point-symmetric positions, and may be positions displaced by an even number of teeth from each other, but the displacement of the engagement positions more than necessary is not preferable because the load applied on the drive shaft 25 increases if the displacement amount becomes large.

Further, the brake plate 72 is arranged as a separate body from the ratchet wheel 80 in the above embodiment, but friction members may be formed by burning on both surfaces of the ratchet wheel 80.

Further, the female screw member 35 which presses the ratchet wheel 80 by load torque acting on the drive shaft 25 is configured such that the male screw part 26 of the drive shaft 25 and the female screw part 36 of the female screw member 35 are screwed together in the above embodiment. However, the female screw member 35 may be provided at a separate body (for example, a male screw provided on the outer peripheral portion of a hollow shaft made by extending the hollow boss part 71*b* of the brake receiver 71) from the drive shaft 25, and may be a mechanism which converts the load torque to a thrust force using a cum.

Further, the brake device 70 of the lever hoist 10 is explained as an example in the above embodiment, and the present invention can be said to relate to a ratchet mechanism in a wide view of the invention. More specifically, the present invention is a ratchet mechanism including a ratchet wheel formed with many ratchet teeth at an outer periphery and at least one pawl member meshing with the ratchet tooth, to allow rotation of the ratchet wheel only in one direction, wherein the ratchet teeth include tall teeth high in projecting height from a center of the ratchet wheel, and short teeth lower in projecting height from the center of the ratchet wheel.

In the ratchet mechanism configured as above, even when the reverse rotation occurs when the tip of the pawl member is located at the tip of the tall tooth or the short tooth, the tip of the pawl member collides at least with the back (slope forming the tall tooth) of a next tall tooth and enters the valley between the ratchet tooth and the ratchet tooth. This can immediately and surely block the reverse rotation of the ratchet wheel.

Here, it is preferable that two pawl members are provided at symmetric positions as illustrated in FIG. 4. Further, it is preferable that the tall teeth and the short teeth are alternately provided. Further, it is preferable that a number of the ratchet teeth equal to double an odd number are provided.

Further, providing two pawl members at the symmetrical positions can eliminate the bias of the stress applied on the ratchet wheel. Further, alternately providing the tall teeth and the short teeth can make the tip of the pawl member collide with the back of the tall tooth located in the immediate vicinity when the reverse rotation occurs. Further, providing a number of the ratchet teeth equal to double an odd number makes it possible that when the tip of one of the pawl members located at the symmetric positions is located at the tip of the tall tooth, the tip of the other pawl member is located at the tip of the short tooth, so that at least the tip of the pawl member located at the tip of the short tooth certainly collides with the back of the adjacent tall tooth when the reverse rotation occurs, thus immediately and surely blocking the reverse rotation of the ratchet wheel.

The above ratchet mechanism is applied to the brake device of the lever hoist resisting input torque in one direction as explained, for example, in the above embodiment, and is especially effective for blocking the reverse rotation of the ratchet wheel constituting the brake device.

The invention claimed is:

1. A brake device which stops reverse rotation of a drive shaft transmitting rotation to a load sheave around which a chain is wound to prevent reverse rotation of the load sheave, the brake device comprising:

a brake receiver pivotally supported in a non-rotatable manner on the drive shaft and including a flange part and a boss part;

a female screw member pivotally supported in a rotatable manner on the drive shaft and screwed to a male screw part provided at an outer periphery of the drive shaft;

a ratchet wheel sandwiched between the flange part and the female screw member facing each other, and including ratchet teeth provided on an outer peripheral side and configured to restrict a rotation direction to one direction;

a brake plate arranged between the ratchet wheel and at least one of the flange part and the female screw member; and at least one pawl member engaging, on a tip side, with a valley part located between adjacent ratchet teeth, and meshing with the ratchet teeth, wherein the ratchet teeth include tall teeth and short teeth lower in projection height from a rotation center of the ratchet wheel than the tall teeth, and the tall teeth and short teeth are alternately adjacent to each other and have equal pitch in the circumferential direction.

2. The brake device according to claim 1, wherein a pair of the pawl members are provided, and the pair of pawl members are arranged at positions symmetric around the drive shaft.

3. The brake device according to claim 2, wherein the ratchet wheel is alternately provided with the tall teeth and the short teeth.

4. The brake device according to claim 3, wherein a number of the ratchet teeth equal to double an odd number are provided.

5. The brake device according to claim 4, wherein a short tooth tip part on a tip side of the short tooth forms a part of an arc.

6. The brake device according to claim 3, wherein a short tooth tip part on a tip side of the short tooth forms a part of an arc.

7. The brake device according to claim 1, wherein under a condition where a space between the tall tooth and the short tooth is a valley part, an inclination angle of a tapered part from the valley part toward the tip side of the tall tooth is provided to be equal to an inclination angle of a tapered part from the valley part toward the tip side of the short tooth.

8. The brake device according to claim 1, wherein the ratchet wheel is alternately provided with the tall teeth and the short teeth.

9. The brake device according to claim 1, wherein a short tooth tip part on a tip side of the short tooth forms a part of an arc.

10. The brake device according to claim 8, wherein a short tooth tip part on a tip side of the short tooth forms a part of an arc.

11. A lever hoist including a brake device which stops reverse rotation of a drive shaft transmitting rotation to a load sheave around which a chain is wound to prevent reverse rotation of the load sheave, the brake device comprising:

a brake receiver pivotally supported in a non-rotatable manner on the drive shaft and including a flange part and a boss part;

a female screw member pivotally supported in a rotatable manner on the drive shaft and screwed to a male screw part provided at an outer periphery of the drive shaft;

a ratchet wheel sandwiched between the flange part and the female screw member facing each other, and including ratchet teeth provided on an outer peripheral side and configured to restrict a rotation direction to one direction;

a brake plate arranged between the ratchet wheel and at least one of the flange part and the female screw member; and at least one pawl member engaging, on a tip side, with a valley part located between adjacent ratchet teeth, and meshing with the ratchet teeth, wherein the ratchet teeth include tall teeth and short teeth lower in projection height from a rotation center of the ratchet wheel than the tall teeth, the tall teeth and short teeth being alternately adjacent to each other and having equal pitch in the circumferential direction, and the lever hoist comprising:

an operation lever configured to turn with respect to the female screw member;

a switching claw for hoisting attached to the operation lever, and meshing in a hoisting direction with a switching gear integral with the female screw member;

a switching claw for lowering attached to the operation lever, and meshing in a lowering direction with the switching gear; and a switching knob provided integrally with the switching claw for hoisting and the switching claw for lowering, and configured to switch with which of the switching claw for hoisting and the switching claw for lowering the switching gear meshes.

* * * * *